US005676885A

United States Patent [19]

Starzewski

[11] Patent Number: 5,676,885
[45] Date of Patent: Oct. 14, 1997

[54] THERMOSTABLE POLARIZERS

[75] Inventor: Karl-Heinz Aleksander Ostoja Starzewski, Bad Vilbel, Germany

[73] Assignee: Agfa-Gevaert AG, Leverkusen, Germany

[21] Appl. No.: 516,888

[22] Filed: Aug. 18, 1995

[30] Foreign Application Priority Data

Aug. 25, 1994 [DE] Germany .............. 44 30 096.4

[51] Int. Cl.$^6$ .................. F21V 9/14; B32B 9/04
[52] U.S. Cl. .............. 252/585; 428/447; 428/451; 428/910
[58] Field of Search ............. 252/585; 428/447, 428/451, 910

[56] References Cited

U.S. PATENT DOCUMENTS

| | | |
|---|---|---|
| 4,812,520 | 3/1989 | Zeigler . |
| 4,818,624 | 4/1989 | Downey, Jr. . |
| 4,866,147 | 9/1989 | Zeigler . |
| 4,893,911 | 1/1990 | Ostoja-Starzewski ............ 252/585 |
| 5,049,427 | 9/1991 | Starzewski et al. . |
| 5,051,286 | 9/1991 | Starzewski ................. 428/910 |
| 5,073,014 | 12/1991 | Ostoja-Starzewski ............ 252/585 |
| 5,468,551 | 11/1995 | Ogawa ..................... 428/447 |

*Primary Examiner*—Philip Tucker
*Attorney, Agent, or Firm*—Sprung Kramer Schaefer & Briscoe

[57] ABSTRACT

Thermostable, flexible polarizers having a polarizing layer of a polyacetylene-containing polymer are obtained if their surfaces are sealed by means of silicate layers.

19 Claims, No Drawings

THERMOSTABLE POLARIZERS

BACKGROUND OF THE INVENTION

The invention relates to thermostable, flexible polarizers containing a polarizing layer of a polyacetylene-(PAC)-containing polymer (POLPAC) having a silicate-sealed surface. The invention furthermore relates to polarizers of this type which are additionally bonded to outer layers.

U.S. Pat. No. 4,818,624 describes the stabilization of light polarizers by surface silylation with an organosilane. The effect is inadequate, since bleaching and colour shifts are observed after 24 hours at only 49° to 74° C. (120° to 165° F.).

The production of laminates from various substrates with adhesion layers between the latter has been disclosed. U.S. Pat. No. 5,049,427 describes laminated polarizers containing a polarizing core layer of a PAC-containing polymer and transparent outer layers, the layers being bonded by means of a specific polyurethane-polyurea.

Although POLPAC polarizers already have excellent properties, the stability under extreme conditions is still unsatisfactory. After storage at 90° C. for 500 hours, the polarizer has changed in its transmission of unpolarized light, the change in transmission $\Delta T_{unpol}$ being greater than 5%.

However, use in optical displays subjected to a particularly high degree of heating (for example dashboards in automobiles) is only possible if the deterioration in the optical properties $\Delta T_{unpol}$ and $\Delta P$ of the polarizer under these conditions is at most 5%, where $\Delta P$ is the change in the degree of polarization. Constant optical properties of POLPAC polarizers at 100° C. for 1000 hours after bonding between glass plates have been described. However, such laminate systems are less suitable for the production of displays where flexible polarizers are preferred, both with respect to the processing properties and for the production of flexible plastic displays.

SUMMARY OF THE INVENTION

The object of the invention was therefore to produce laminated polarizers based on a PAC-containing polymer which satisfy the abovementioned conditions.

Surprisingly, it has now been found that this object can be achieved if the POLPAC polarizer is sealed on its surface by means of a silicate layer.

The invention furthermore relates to a laminated, flexible polarizer comprising a polarizing core layer of a PAC-containing polymer and transparent, flexible outer layers applied to both sides, characterized in that the core layer and the outer layers are bonded by means of a silicate layer, and the polarizer laminated in this manner is flexible.

DETAILED DESCRIPTION OF THE INVENTION

The silicate layer means that the polarizer can also be used for lamination to glass plates, optical lenses or prisms. If the polarizer is bonded on one side to a glass display or another glass element by means of an organic adhesive, it is sufficient to protect its free surface by means of a silicate layer.

The silicate layers are preferably applied to the core layer and/or the outer layers in the form of an aqueous solution.

Suitable aqueous solutions of silicates are known aqueous solutions of sodium water glass and potassium water glass. Conventional types of sodium water glass have solids contents of from 25 to 60% by weight and $SiO_2$ contents of from 20 to 40% by weight, the remainder of the solids content being $Na_2O$, and conventional types of potassium water glass have solids contents of from 25 to 40% by weight and $SiO_2$ contents of from 20 to 30% by weight, the remainder of the solids content being $K_2O$. In order to obtain thinner silicate layers, these solutions can also be diluted with water.

The $SiO_2$ contents are preferably as high as possible, i.e. the $SiO_2/Na_2O$ weight ratio is preferably $\geq 3$ or the $SiO_2/K_2O$ weight ratio is $\geq 2.2$.

The use of the silicate layers means that it is unnecessary to use organic adhesives, as described in large number in U.S. Pat. No. 5,049,427.

The silicate layers stabilize the properties of the PAC polarizer, even in a layer thickness of $\leq 2$ μm. From 100 mg to 2 g of water glass (solid)/m² of area to be bonded are preferably required to give thermostable bonding of the laminate.

In the preferred embodiment, the core layer and/or outer layer are treated with a silane or borate before being coated with the silicate solution. This measure improves, in particular, the bond strength.

Suitable silanes conform to the formula:

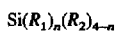

$$Si(R_1)_n(R_2)_{4-n}$$

in which the $R_1$ radicals, independently of one another, are halogen or alkoxy, the $R_2$ radicals, independently of one another, are alkyl or alkenyl, and n is the number 2, 3 or 4.

Alkyl and alkoxy radicals $R_1$ and $R_2$ may be substituted.

Examples of suitable silanes are tetramethoxysilane, tetraethoxysilane, methyltrimethoxysilane, dimethyldimethoxysilane, ethyltriethoxysilane, dimethyldichlorosilane, vinylmethyldichlorosilane and vinyltriethoxysilane. Silanes can also be mixed, for example emulsified, directly into the silicate solution.

Examples of suitable borates are boric acid and borax. Boric acid and borates can also be mixed or dissolved directly into or in the water glass solution.

The silanes and borates are applied, in particular, by dipping the core layer and/or outer layer into a solution of the compound or, if the compound is liquid, into the pure compound and removing it again. The amount taken up is so small that it cannot reliably be determined by weighing, but is usually less than 1 g/m².

The outer layers have, for example, thicknesses of from 5 μm to 1 mm, preferably from 20 to 200 μm. The polarizing core layer has, for example, a thickness of from 1 to 200 μm, preferably from 5 to 50 μm.

Examples of outer layers are aromatic polyesters, polyacrylonitriles, poly(meth)acrylates, polysulphones, aromatic polycarbonates, cellulose acetates, cellulose acetobutyrates, polyamides, polyhydantoines, polyimides, polyamidimides, polypara-phenylenebenzobisimidazoles and -oxazoles and polyether ketones, preference being given to polyesters, poly(meth)acrylates, polycarbonates and cellulose esters. The transparency of these materials is their most important feature. They are generally employed in the form of films.

The polarizing core layer is a polarizer made from PAC-containing polymer products whose matrix is a polymer containing polar groups and which have a maximum degree of polarization P of at least 90%, preferably at least 95%, particularly preferably at least 98%, and a maximum dichroic ratio $Q_E$ of 5 or more, preferably 10 or more, in both cases based on the region of visible light. These polarizers are employed in the form of films in which a preferential direction has been generated by stretching. The degree of stretching ε is greater than 200%, preferably at least 400%, particularly preferably from 500% to 1000%.

The degree of polarization P for linear-polarized light and the degree of stretching ε are defined as follows:

$$P = \frac{\text{Transmission in the pass position minus transmission in the block position}}{\text{Transmission in the pass position plus transmission in the block position}} \times 100$$

$$\epsilon = \frac{l - l_o}{l_o} \times 100$$

(l=length after stretching; $l_o$=length before stretching)

The production of PAC-containing polymer products is disclosed, for example, in U.S. Pat. No. 5,049,427, in which acetylene is polymerized in a polymer solution in the presence of a suitable catalyst.

Examples of suitable polymers are polyvinylchloride, polyvinylbutyral, polyvinylalcohol (PVA), partially hydrolysed polyvinyl acetate (PVAC) and other vinyl alcohol-containing (co)polymers, polyacrylonitrile, acrylonitrile-containing copolymers, polyvinylpyrrolidone, methylcellulose and other cellulose derivatives, and polycarbonate. Preference is given to solutions of PVA and partially hydrolysed PVAC.

Examples of solvents for the polymers are N-methylpyrrolidone (NMP), dimethylformamide (DMF), dimethylsulphoxide (DMSO), inter alia. The concentration of the polymer in the solvent is from 1 to 20% by weight, preferably from 2 to 10% by weight.

The novel laminated polarizers are distinguished by a number of excellent properties:

1. high light transmission,
2. a high degree of light fastness,
3. thermostability of the polarizing core layer,
4. excellent mechanical properties.

The novel polarizers are suitable for all areas of application in which polarizing films or foils are used, in particular in optics (for example polarizing microscopes, photography, antireflection coating of sunglasses and ski goggles) and for displays, for example in watches, calculators, laptops, computers, indicators, projection displays, video games, camcorders and flat-screen TV sets.

At 80° C., even unlaminated POLPAC films without stabilizers have good stability, the change in transmission (ΔT) after 500 hours at 80° C. in air being 2–3% and the change in the degree of polarization (ΔP) being less than 1%.

In addition to the polyacetylene, the novel polarizer can also contain additional dichroic substances, for example iodine or dichroic dyes. However, polyacetylene makes up at least 50% by weight, preferably at least 80% by weight, of the total amount of dichroic substances.

EXAMPLES

Example 1

A 700%-stretched POLPAC film having a layer thickness of 11 μm had a transmission T of 38.7% at 600 nm and a degree of polarization P of 99.99%. After 500 hours at 80° C., the transmission had risen to 41.7% and the degree of polarization only dropped to 99.89%.

Example 2

The same film as in Example 1 was kept at 90° C. After only 270 hours, the transmission at 600 nm had risen by 5.1 percentage points while the degree of polarization had dropped by 1.84 percentage points.

Example 3

The POLPAC film was immersed in an aqueous sodium silicate solution and then dried. The transmission T at 600 nm was 36.3% and the degree of polarization P was 99.95%. After 1446 hours at 90° C., the values were virtually unchanged: T=36.6%, P=99.96%.

Example 4

A polyvinyl alcohol/polyacetylene film (A) having a polyacetylene content of 1.5% by weight was stretched by about 600%. After stretching, the film had a thickness of 12 μm.

This film was laminated as follows:

Cellulose triacetate (CTA) films with a thickness of about 100 μm were coated on one side with sodium water glass. The above-described polyvinyl alcohol/polyacetylene film was applied to the coated side of one of these CTA films coated with sodium water glass. A second cellulose triacetate film was applied by means of its sodium water glass-coated side to the free surface of the polyvinyl alcohol/polyacetylene film. The film laminate was allowed to run through a rubber calender and was subsequently cured for 10 minutes at 80° C.

The optometric data were then measured using light with a wavelength of 600 nm: T=35.2%, P=99.9%.

The values did not change after storage at 90° C. for 500 hours. After storage at 160° C. for 16 hours, the following values were measured: T=35.1%, P=99.9%.

Example 5

A POLPAC film was immersed for 5 minutes in a tetraethoxysilane/THF solution containing 10% by weight of silane, and was dried and then bonded between 2 CTA films having a thickness of 100 μm. To this end, the POLPAC film was laid on a CTA film which had been coated on one side with a sodium silicate solution. A second CTA film which had likewise been coated with sodium silicate solution was then laid by means of the moist silicate layer on the still unprotected POLPAC side, and the film laminate was pressed together through the rubber walls of a calender and dried at 95° C. for 5 minutes. The laminate had high strength, forcible separation resulting in either disintegration of the core layer or tearing of the CTA film. The laminate was so flexible that it could be bent to and fro many times without breaking or losing its excellent thermostability.

The stability of the laminate film was tested at 120° C. The transmission, measured at 600 nm, before the heat test was 36.6% with a degree of polarization of 99.9%. After 1000 hours at 120° C. in air, T had only dropped to 36.1%, with the degree of polarization still at 99.9%.

What is claimed is:

1. A thermostable, flexible polarizer having a polarizing layer of a polyacetylene-containing polymer and having silicate-sealed surfaces, wherein the sealing of the surface is carried out by means of silicate solution.

2. The polarizer of claim 1, which additionally has transparent, flexible outer layers applied to both sides and bonded to the polarizing layer by means of silicate layers.

3. The polarizer of claim 1, wherein the polarizing layer is treated with a silane or a borate before coating with the silicate solution.

4. The polarizer of claim 1, wherein the silicate solution is admixed with a silane and/or borate.

5. The polarizer of claim 3, wherein the silane conforms to the formula $$Si(R_1)_n(R_2)_{4-n}$$

in which the $R_1$ radicals, independently of one another, are halogen or alkoxy, the $R_2$ radicals, independently of one another, are alkyl or alkenyl, and n is the number 2, 3 or 4.

6. The polarizer of claim 1, wherein the polyacetylene-containing polymer is at least partly polyvinyl alcohol.

7. The polarizer of claim 1, which contains additional dichroic substances.

8. The polarizer of claim 2, wherein the outer layers are treated with a silane or a borate before coating with the silicate solution.

9. The polarizer of claim 8, wherein the silane conforms to the formula $$Si(R_1)_n(R_2)_{4-n}$$

in which the $R_1$ radicals, independently of one another, are halogen or alkoxy, the $R_2$ radicals, independently of one another, are alkyl or alkenyl, and n is the number 2, 3 or 4.

10. A thermostable, flexible polarizer having a polarizing layer of a polyacetylene-containing polymer and having silicate-sealed surfaces with a silicate solution, wherein the sealing of the surface is carried out by means of sodium water glass or potassium water glass.

11. The polarizer of claim 10, which additionally has transparent, flexible outer layers applied to both sides and bonded to the polarizing layer by means of silicate layers.

12. The polarizer of claim 10, wherein the polarizing layer is treated with a silane or a borate before coating with the silicate solution.

13. The polarizer of claim 10, wherein the silicate solution is admixed with a silane and/or borate.

14. The polarizer of claim 12, wherein the silane conforms to the formula $$Si(R_1)_n(R_2)_{4-n}$$

in which the $R_1$ radicals, independently of one another, are halogen or alkoxy, the $R_2$ radicals, independently of one another, are alkyl or alkenyl, and n is the number 2, 3 or 4.

15. The polarizer of claim 10, wherein the polyacetylene-containing polymer is at least partly polyvinyl alcohol.

16. The polarizer of claim 10, which contains additional dichroic substances.

17. The polarizer of claim 10, wherein the sealing of the surface is carried out by means of from 100 g to 2 g of water glass (solid)/m² of area to be sealed.

18. The polarizer of claim 11, wherein the outer layers are treated with a silane or a borate before coating with the silicate solution.

19. The polarizer of claim 18, wherein the silane conforms to the formula $$Si(R_1)_n(R_2)_{4-n}$$

in which the $R_1$ radicals, independently of one another, are halogen or alkoxy, the $R_2$ radicals, independently of one another, are alkyl or alkenyl, and n is the number 2, 3 or 4.

* * * * *